United States Patent [19]

Boydston et al.

[11] Patent Number: 5,794,971

[45] Date of Patent: Aug. 18, 1998

[54] PORTABLE AIR BAG

[75] Inventors: L. E. Bailey Boydston, Pacifica; George Wojdylak, Frenso, both of Calif.

[73] Assignee: Double Eagle, Ltd., Inc., Fresno, Calif.

[21] Appl. No.: 495,929

[22] Filed: Jun. 28, 1995

Related U.S. Application Data

[63] Continuation-in-part of Ser. No. 415,070, Mar. 31, 1995, which is a continuation of Ser. No. 941,165, Sep. 4, 1992, abandoned.

[51] Int. Cl.⁶ .................................................. B60R 21/18
[52] U.S. Cl. ..................... 280/733; 280/728.3; 280/735; 280/743.1
[58] Field of Search .................... 280/733, 793.1, 280/735, 728.3

[56] References Cited

U.S. PATENT DOCUMENTS

| 3,792,874 | 2/1974 | Ayres et al. | 280/734 |
| 3,888,503 | 6/1975 | Hamilton | 280/733 |
| 4,995,639 | 2/1991 | Breed | 280/735 |
| 5,100,169 | 3/1992 | Goor et al. | 280/733 |
| 5,162,006 | 11/1992 | Yandle, II | 280/733 |

FOREIGN PATENT DOCUMENTS

| 2262720 | 6/1993 | United Kingdom | 280/733 |

*Primary Examiner*—Eric D. Culbreth
*Attorney, Agent, or Firm*—Klima & Pezzlo, PC

[57] ABSTRACT

A portable air bag device that can be connected to a person and/or vehicle. The portable air bag device includes an enclosure containing a pressurized gas cylinder, controllable gas release valve and control/sensor for activating the device during a crash.

11 Claims, 14 Drawing Sheets

PORTABLE AIR BAG

RELATED APPLICATION

This is a continuation-in-part of U.S. patent application entitled "Portable Passenger Air Bag", Ser. No. 08/415,070, filed on Mar. 31, 1995, which is a continuation of U.S. patent application entitled "Portable Passenger Air Bag", Ser. No. 07/941,165, filed on Sep. 4, 1992, now abandoned, both fully incorporated by reference herein.

FIELD OF THE INVENTION

The present invention is directed to a portable air bag that can be releasably connected to a person and/or vehicle to protect a passenger against personal injury during a crash.

BACKGROUND OF THE INVENTION

Air bags have been in development for many years, and are currently being seriously introduced into new vehicles being sold today. In the past, the cost of adding air bags to vehicles has been a significant deterrent in the wide spread acceptance of this promising safety device.

The prior art air bags generally require some type of permanent attachment to the vehicle. For example, many air bag models are associated with the steering column and dashboard of the vehicle. Other types of air bags are associated with the seats and/or current vehicle restraints.

These prior art air bags are connected to the vehicle primarily to anchor the air bag or related mechanism securely. Other reasons for attaching the air bag to the vehicle include providing remote sensors and/or gas supplies that are integrally connected with the vehicle.

SUMMARY OF THE INVENTION

A first object of the present invention is to provide a portable air bag, which can be releasably connected to a person and/or vehicle.

A second object of the present invention is to provide a portable air bag that specifically connects with a vehicle restraint belt for operation thereof.

A third object of the present invention is to provide a portable air bag comprising an enclosure containing an air bag, gas pressure cylinder disposed within the air bag, a control valve connected to the gas pressure cylinder, and a sensor/control for detecting a crash and activating the device.

The present invention is directed to a portable air bag that can be carried around by individual and moved with the person from one vehicle to the next. In order to allow an air bag device to be completely portable, the device must contain all the necessary components of a fixed air bag type system in a single portable unit in a particular arrangement. The desire for portability requires certain features and construction such as small size, light weight, compact construction and new arrangement in order to become successful in marketing and operation.

The portable air bag according to the present invention includes an enclosure that can be releasably connected to or anchored to the person and/or vehicle. The preferred connection is to an existing restraint belt system of the conventional vehicle because of its location relative to a passenger and structural strength. Current vehicles are provided with the combination of lap and shoulder belts. Thus, the portable air bag device according to the present invention is preferably releasably connected to either or both of the lap and shoulder belts.

The device can be attached to the lap or shoulder restraint belt in various ways. The attachment should provide a strong and secure connection in order to maintain the proper location and orientation of the device during the rest stage while being worn by a passenger, and during the deployment stage. Further, the construction and materials of the enclosure and attachment must be durable and wear-proof to provide years of use, and sufficiently strong to endure the loads during the deployment operation. It is desirable that the enclosure and attachment are made of acrylic backed nylon woven material, the same as or similar to air bag material.

The main components of the air bag device according to the present invention include a pressurized gas container and an inflatable air bag preferably folded in a desired manner, and located within an enclosure. The air bag device includes means for deploying the air bag such as a sensor for detecting a situation requiring deployment of the air bag and a control for operating the deployment of the air bag based on the detection signal.

The preferred means for deploying the air bag includes an electrical sensor for sensing one or more conditions indicating an accident or crash in combination with an electrical control for operating a gas release control valve on the pressurized gas container such as a rupturable membrane or solenoid valve. The electrical sensor is preferably a sensor (e.g., pressure and/or inertial type) or a plurality of sensors positioned on the device, within the device or remote from the device in a manner so as to detect a sudden deceleration of the vehicle. A preferred location of the sensor is on the firewall or other structural component of the vehicle so as to positively receive an impulse due to the crash. In this remote type of sensor, the air bag device is electrically and detachably connected to the remote sensor.

The enclosure is designed to open in some manner upon the activation of the device causing the air bag to be inflated by the pressurized gas container such as a pressure cylinder. The enclosure can be provided with a rupturable seam so that the air bag being inflated bursts outwardly through the rupturable seam. The rupturable seam can be provided as a line of weakness in the material of the enclosure. Alternatively, a zipper can be provided as a rupturable seam.

The pressurized gas container is preferably secured within the air bag itself. For example, the pressurized gas container can be located inside an envelope or pocket provided inside the air bag. This assembly of pressurized gas container and air bag is located completely inside the enclosure in the non-deployed state.

BRIEF DESCRIPTION OF THE DRAWINGS

FIG. 28 is a diagrammatic layout showing the electrical and mechanical connections of the air bag device with the firewall mounted remote sensor.

DETAILED DESCRIPTION OF PREFERRED EMBODIMENTS

The term "portable air bag device" defines a portable device comprising an inflatable air bag. The device may comprise additional components such as air bag inflation means (e.g. pressurized gas cylinder), air bag deployment control means (e.g. controllable gas valve) and other optional features and components.

The portable air bag device according to the present invention must be connected to the passenger and/or vehicle in some suitable manner. The preferred connection is to a conventional lap and/or shoulder belt. Alternatively, the vehicle can be fitted with a custom-made vehicle restraint for the portable air bag device requiring some installation prior to use.

Figure 1:
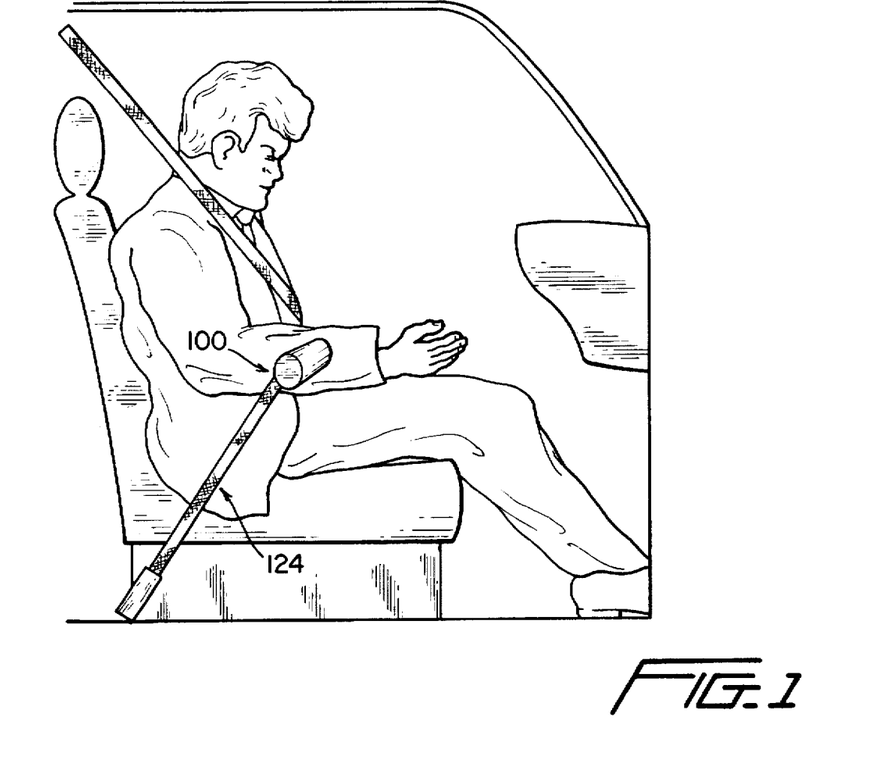
FIG. 1 is a side elevational view of a passenger sitting in a vehicle showing an air bag device according to the present invention with the air bag uninflatable (i.e., non-deployed).
Figure 2:
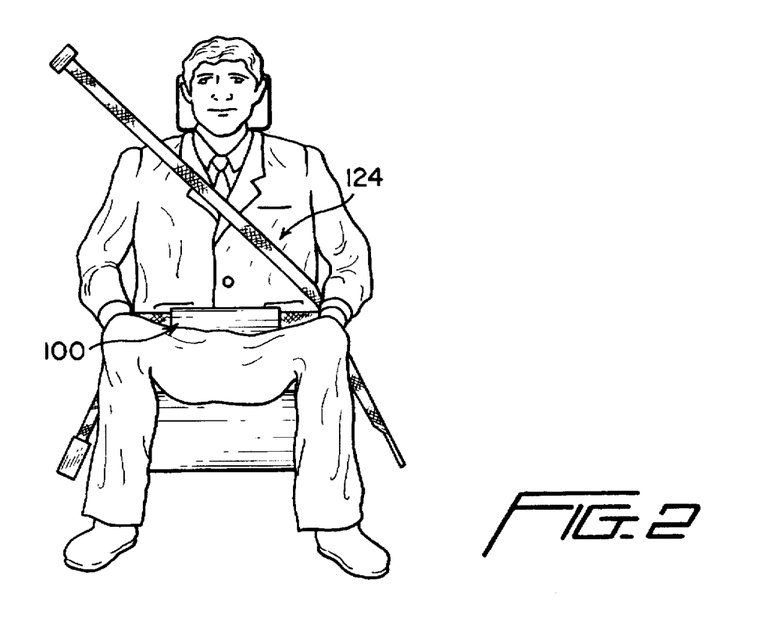
FIG. 2 is a front elevational view of FIG. 1, also with the air bag uninflated.
Figure 3:
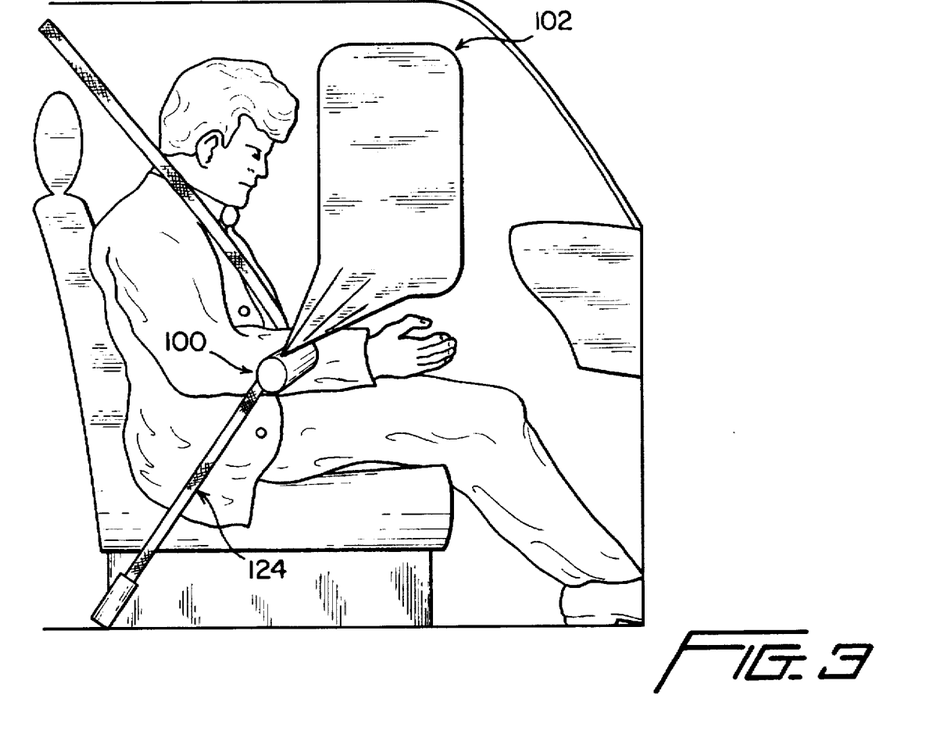
FIG. 3 is a side elevational view of the passenger shown in FIG. 1, except with the air bag fully inflated showing the spacial relationship of the passenger and deployed air bag.
Figure 4:
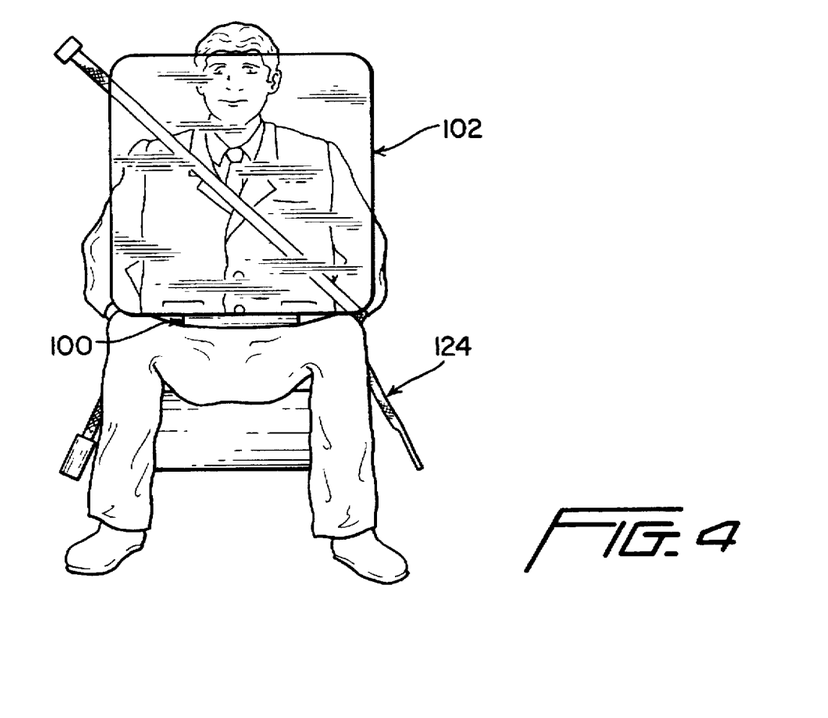
FIG. 4 is a front elevational view of the passenger shown in FIG. 2, except with the air bag fully inflated.

FIGS. 1 and 2 show a preferred embodiment of an air bag device 100 connected to a lap restraint belt 124 with a non-deployed air bag (not shown) contained within the air bag device 100. FIGS. 3 and 4 show the air bag device 100 comprising an air bag 102 fully inflated after deployment.

Figure 5:
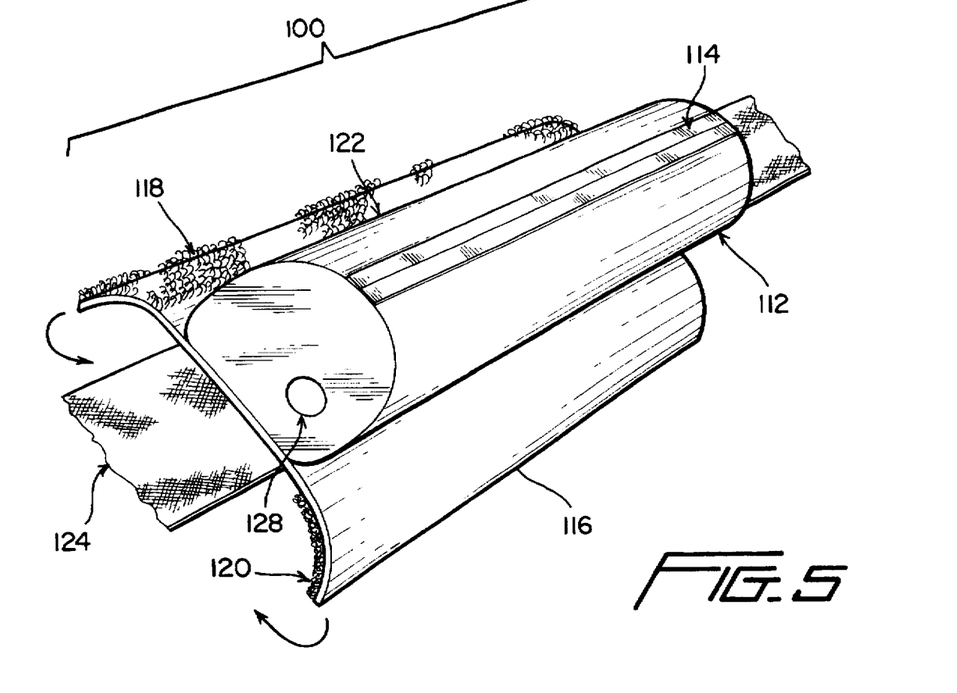
FIG. 5 is a perspective view of a preferred embodiment of the air bag device according to the present invention.
Figure 6:
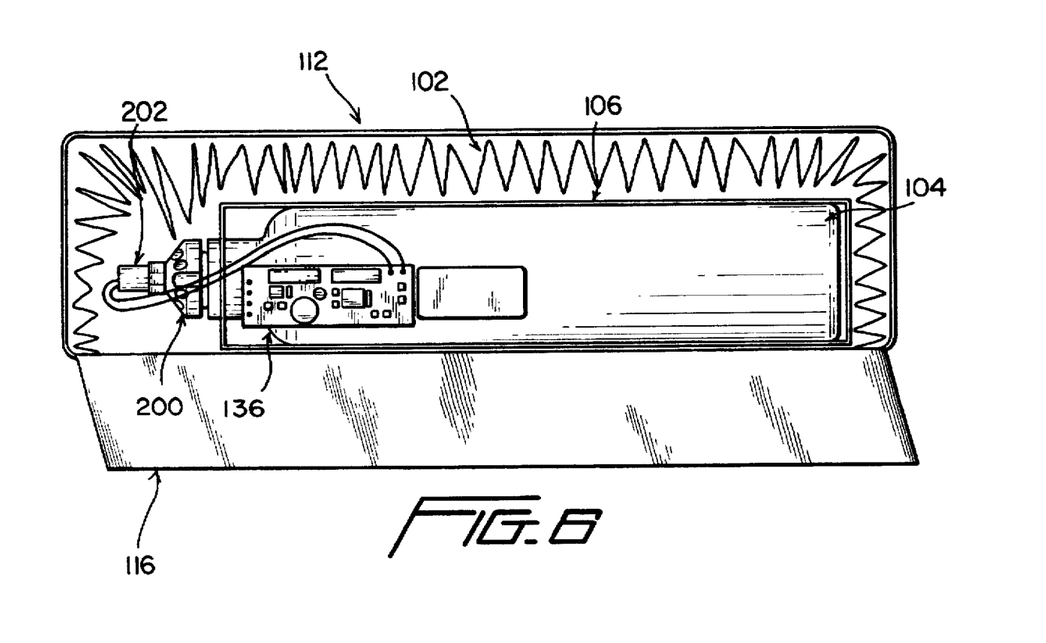
FIG. 6 is a longitudinal cross-sectional view of the air bag device shown in FIG. 5, exposing the pressurized gas cylinder, control valve, and firing circuit.

The details of the preferred embodiment of the air bag device 100 is shown in FIG. 5. The air bag device 100 comprises an enclosure 112 having a rupturable seam 114 to allow egress of the air bag from the enclosure 112 during deployment. An attachment for connecting the enclosure 112 to the lap restraint belt 124 comprises flaps 116 and 118 in this particular embodiment. However, other suitable attachment means can be substituted for the one shown and described. For example, positive closing metal clips or some other suitable releasable mechanical fastener can be substituted.

The flaps 116 and 118 are provided with hook and loop type fastener portions 118 and 120 for example. Velcro fasteners to provide a releasable attachment. This arrangement allows the air bag device 100 to be repeatedly connected and disconnected from the restraint belt 124 with minimum effort. Alternatively, the flaps portions 118 and 120 can be provided with a zipper substituting for the hook and loop type fastener.

The contents of the preferred embodiment of the air bag device 100 is shown in FIGS. 6 to 9. The air bag device 100 comprises a pressurized gas cylinder 104 (e.g. made of aluminum or fiberglass) fitted with an electrically controllable release valve mechanism (i.e., control valve 200, see FIGS. 25 and 26) to be described in detail below. The control valve 200 is electrically connected to a "smart" control circuit board 136 that controllably provides a firing current to the control valve 200 to initiate air bag deployment. The air bag 102 is folded and positioned in a space between the pressurized gas cylinder 104 and the enclosure 112.

The enclosure 112 is preferably made of air bag type fabric, and is provided with a rupturable seam 114. The rupturable seam 114 can be made to be sealable or resealable to allow the enclosure 112 to be opened for loading the deflated air bag 102. Further, the rupturable seam 114 is preferably made so that the rupturable seam is pulled apart along its entire length upon inflation of the air bag 102. For example, the rupturable seam 114 can be made of material with a thinner longitudinal section connecting together parallel thicker longitudinal sections so that the expanding air bag 102 exerts a sufficient force, upon expansion, to preferentially tear the thinner longitudinal section along its longitudinal axis.

Figure 7:
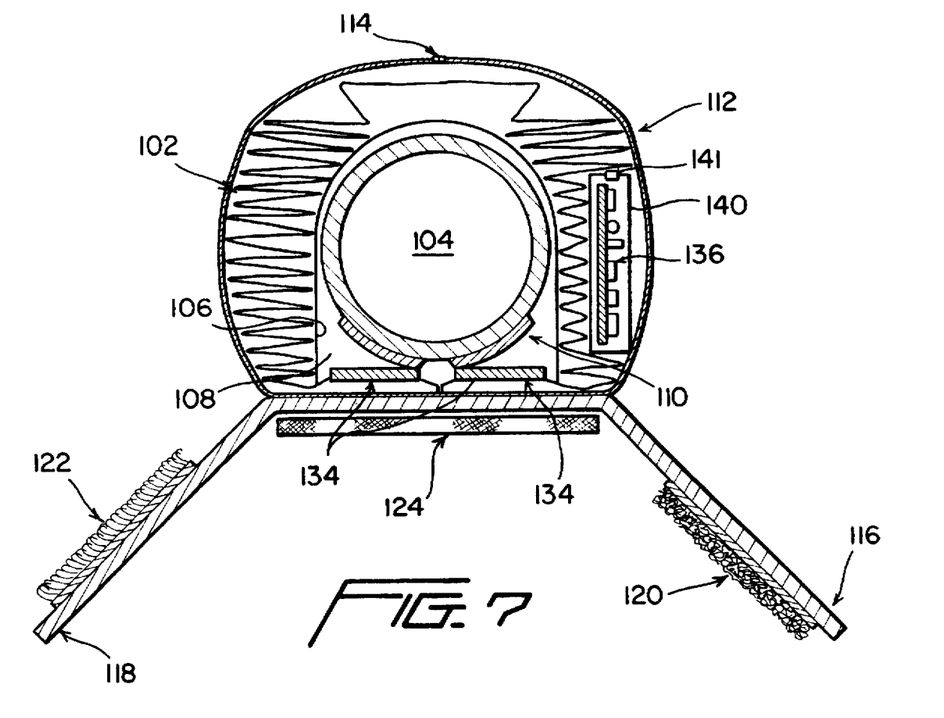
FIG. 7 is a transverse cross-sectional view of the air bag device shown in FIG. 5 with the flaps of the attachment in an open position.
Figure 8:
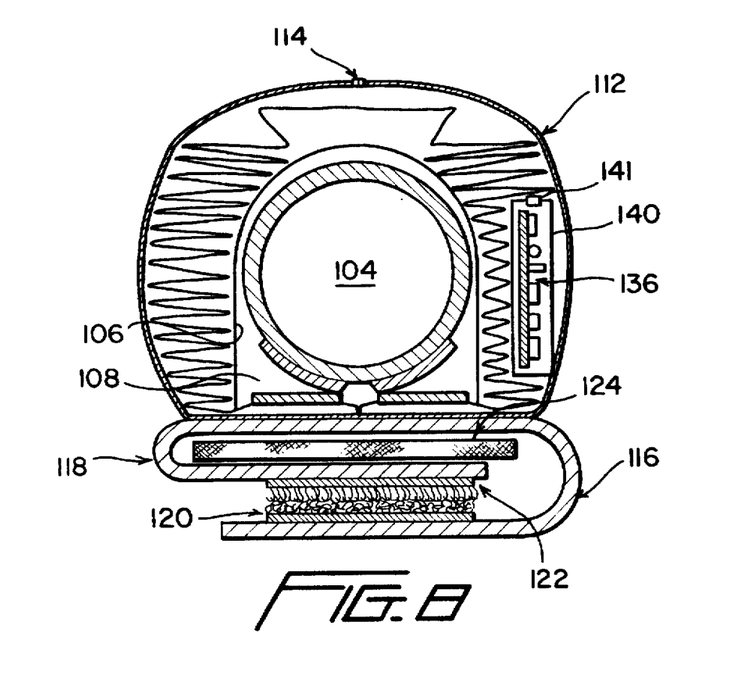
FIG. 8 is a transverse cross-sectional view of the air bag device shown in FIG. 5 with the flaps of the attachment in a closed or fastened position.
Figure 9:
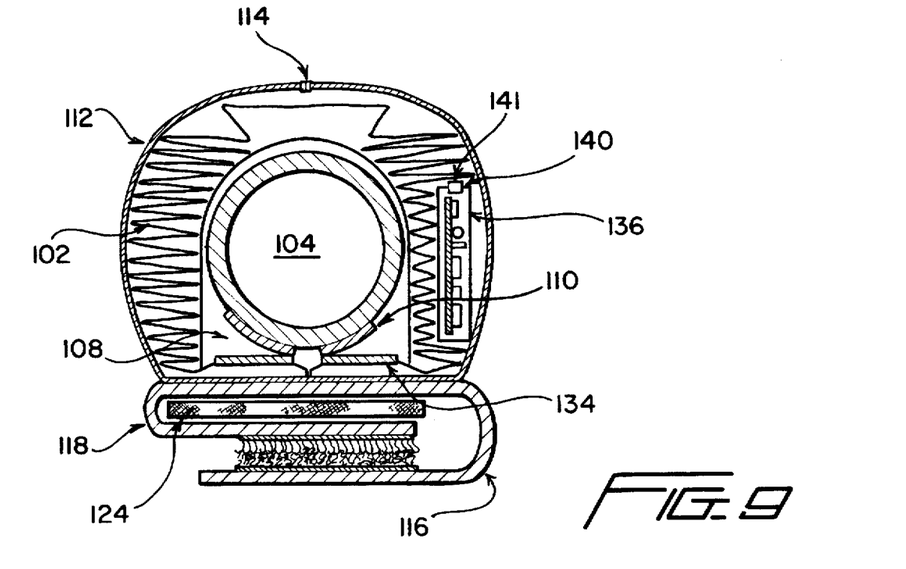
FIG. 9 is a transverse cross-sectional view of the air bag device shown in FIG. 5 with the air bag uninflated and showing the placement of the gas cylinder inside the inner sheath, and positioning of the folded air bag and firing circuitry.

In FIG. 7, the air bag device 100 is shown detached from the restraint belt 124 with the flaps 116 and 118 not connected together. In FIG. 8, the air bag device 100 is securely attached to the restraint belt 124 with the hook and loop portions 120 and 122 of the flaps 116 and 118 connected together.

The pressurized gas cylinder 104 is preferably disposed within the air bag 102 itself. In a preferred embodiment, the air bag 102 is provided with an inner sheath 106 forming an envelope or pocket 108 for containing the pressurized gas cylinder 104 and mounting the pressurized gas cylinder 104 inside the air bag 102. A pair of fabric strips 134 (e.g. strips of hook and loop type fastener) are provided inside the inner sheath 106 to reinforce the bottom panel of the inner sheath 106, by providing an extra layer of material adjacent thereto, and to provide a snug fit between the outer surface of the pressurized gas cylinder 104 fitted with attached mating strips of hook and loop type fastener.

The "smart" control circuit board 136 for operating the air bag device 100 is preferably located inside the air bag enclosure 112 and outside the inflatable air bag 102. However, the "smart" control circuit board can be part of or incorporated in a remote sensor device.

Figure 10:
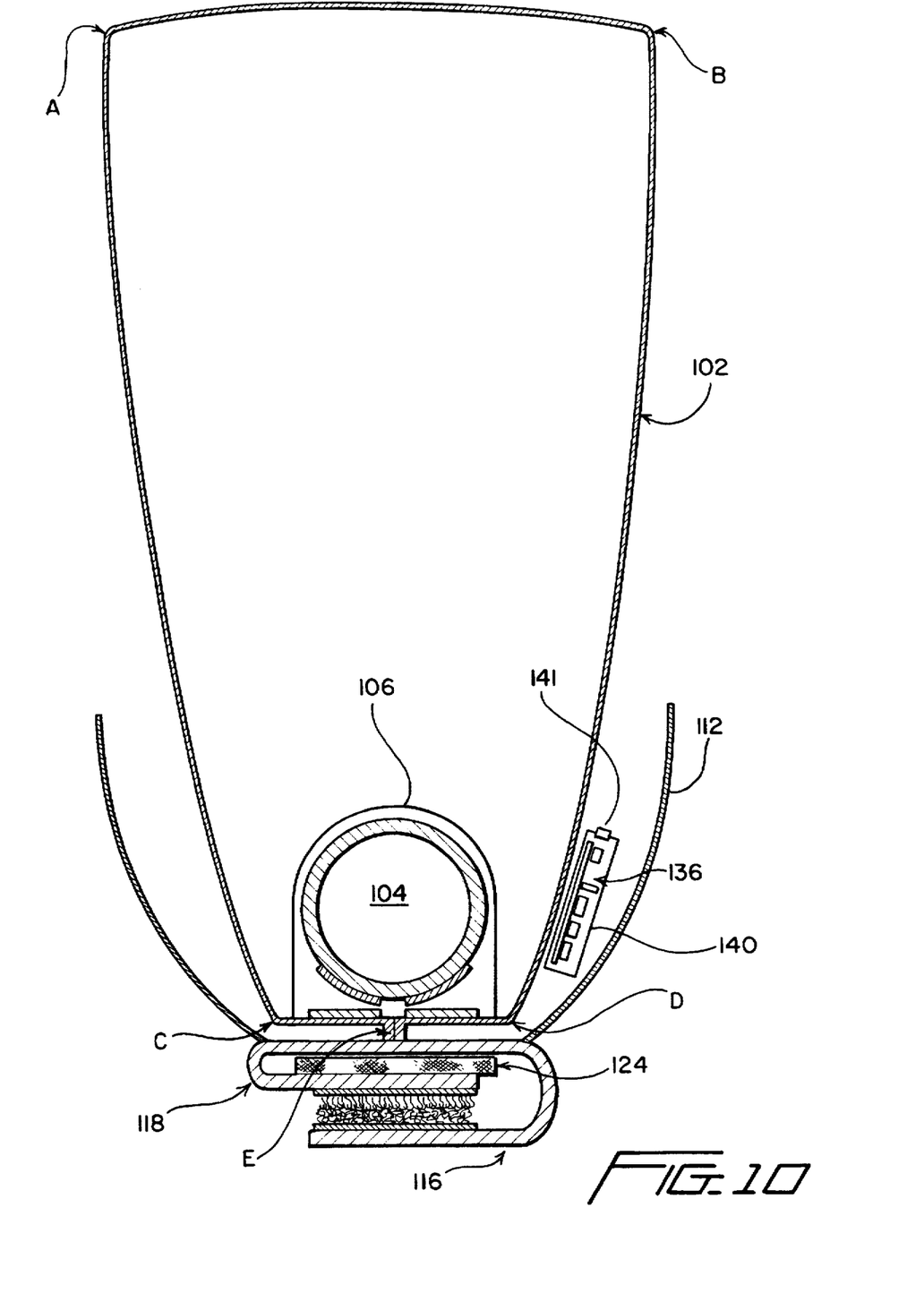
FIG. 10 is a transverse cross-sectional view of the air bag device shown in FIG. 5 with the air bag fully inflated and showing the placement of the gas cylinder, inner sheath, fully inflated air bag, and firing circuitry.

The deployed air bag device 100 is shown in FIG. 10. The main components of the air bag device 100 comprise the air bag 102, pressurized gas cylinder 104, and "smart" circuit board 136. The air bag 102 is made of flexible air bag type fabric sewn at positions A and B to provide the shape shown when the air bag 102 is fully inflated. The inner sheath 106 is made from a piece of air bag fabric sewn to the air bag 102 at positions C and D. The air bag 102 is sewn to the enclosure 112 at position E.

Figure 11:
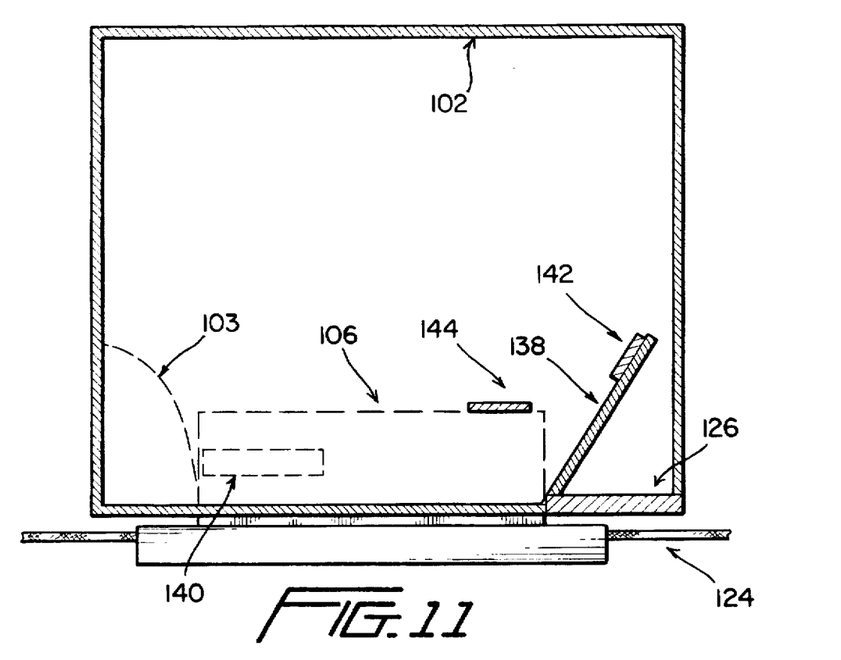
FIG. 11 is a longitudinal cross-sectional view of the air bag device shown in FIG. 5.
Figure 12:
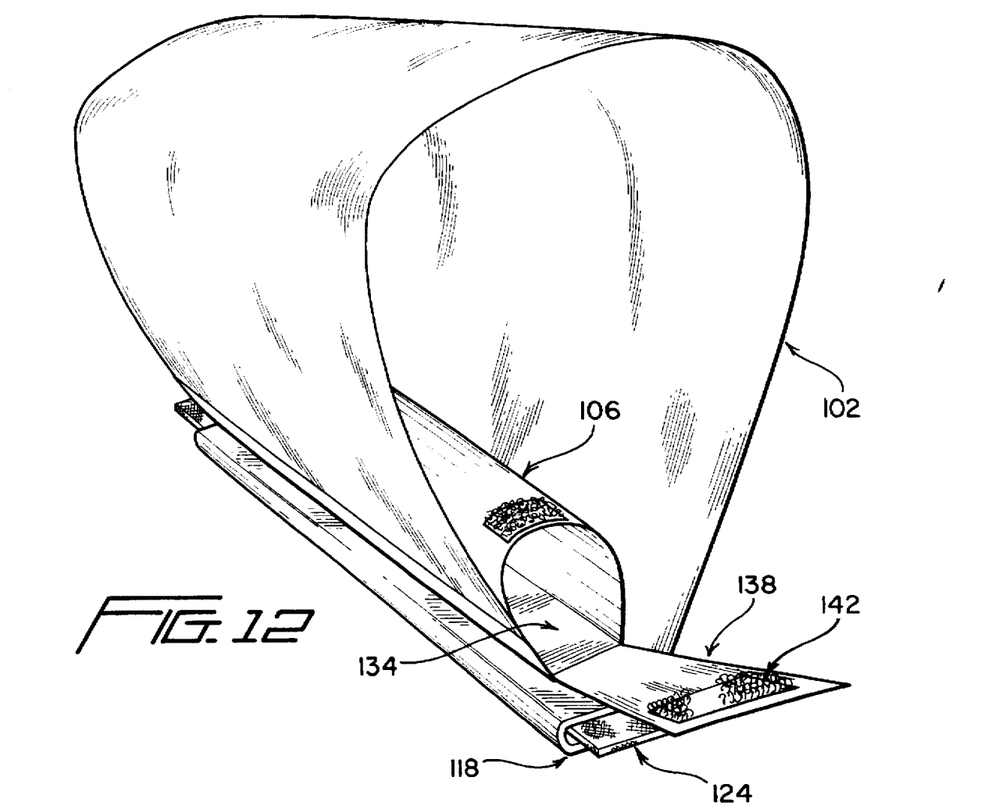
FIG. 12 is a diagrammatic view of the air bag device shown in FIG. 10, however, in a fully inflated condition.
Figure 13:
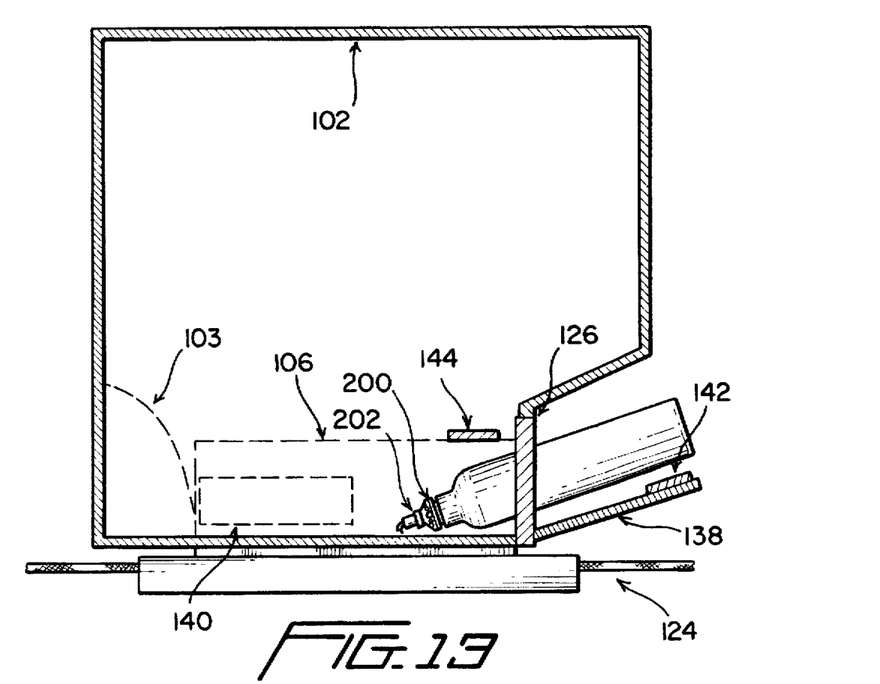
FIG. 13 is a side diagrammatic view of the embodiment shown in FIG. 12 with the envelope or pocket containing the pressurized gas cylinder in an open condition.
Figure 14:
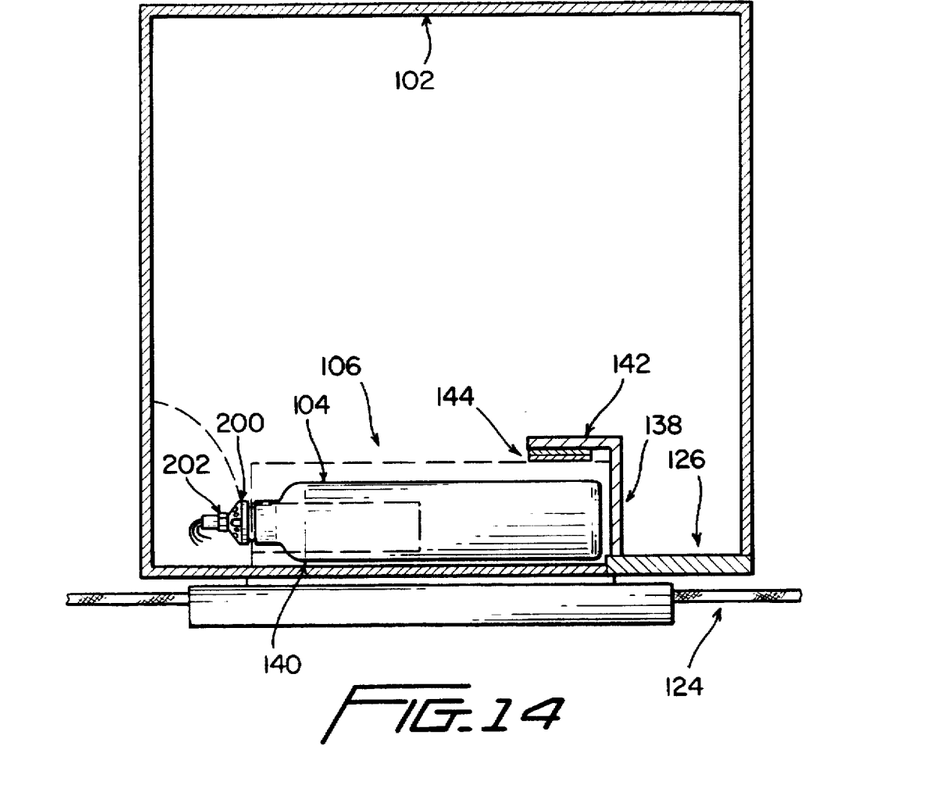
FIG. 14 is a side diagrammatic view of the embodiment shown in FIG. 12 with the envelope or pocket containing the pressurized gas cylinder in a closed condition.
Figure 15:
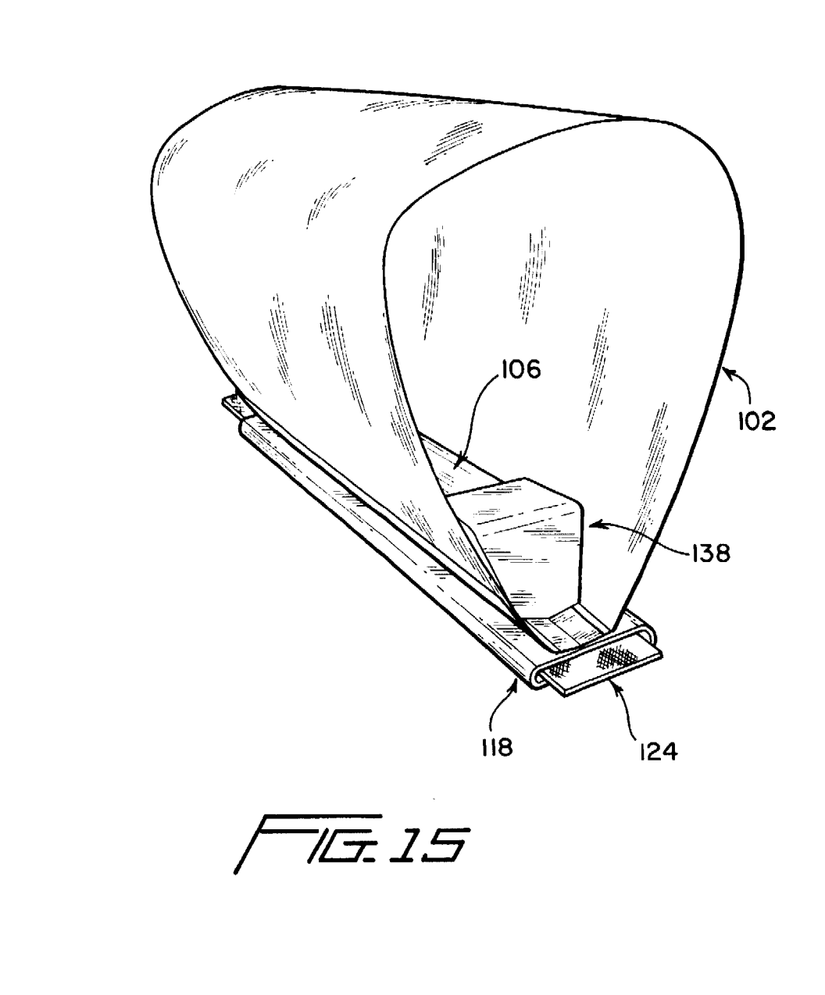
FIG. 15 is a partially broken away perspective view of the air bag device showing the envelope inside the air bag for containing the gas cylinder with the sealing flap closed.

The air bag 102 is provided with a zipper 126 at the lower end of the air bag 102, as shown in FIG. 11. The zipper 126 allows for access inside of the air bag 102 to allow the pressurized gas cylinder 104 to be loaded inside the air bag 102 into the inner sheath 106. The inner sheath 106 is provided with an end flap 138 having a hook and loop fastener portion 142 mating with a hook and loop fastener portion 144 provided on the inner sheath 106, as shown in FIG. 12. The end flap 138 can be opened allowing the pressurized gas cylinder 104 to be loaded through the zipper 126 of the air bag 102 and then through the end of the inner sheath 106, as shown in FIG. 13. The end flap 138 can then be closed to securely contain the gas cylinder 104 within the inner sheath 106, as shown in FIGS. 14 and 15.

Figure 16:
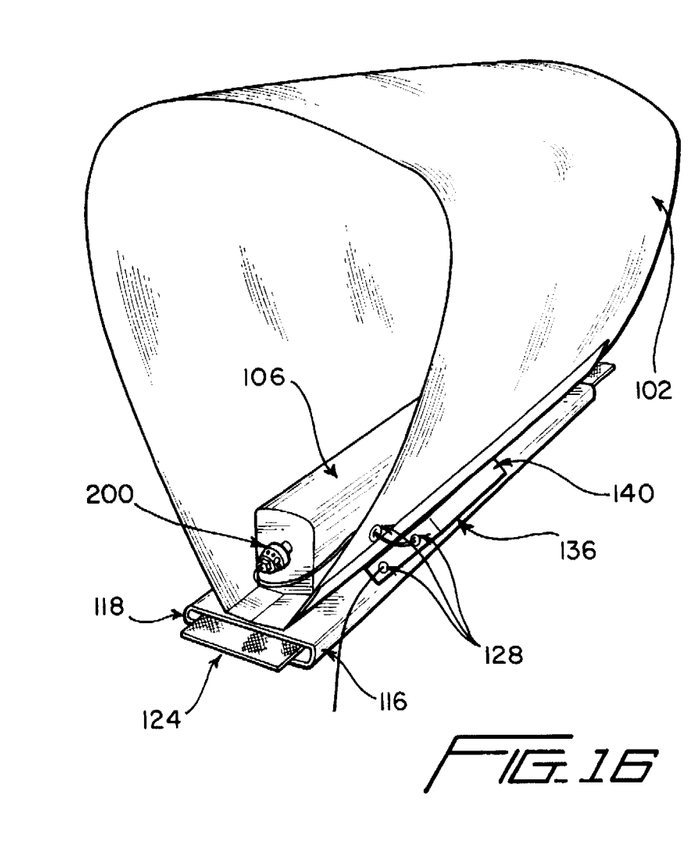
FIG. 16 is a partially broken away perspective view of the air bag device showing the envelope inside the air bag for containing the gas cylinder with the sealing flap opened.

The gas cylinder 104 is positioned within the inner sheath 106 with the control valve 200 of the bottle protruding out of a split flap 146 located at one end of the inner sheath 106, as shown in FIG. 16. The wiring 148 from the control valve 200 is threaded through reinforced eyelets 128 to the "smart" control circuit board 136 contained within a pouch 140 (see FIG. 9). Specifically, the "smart" control circuit board 136 is contained within a pouch 140 having a zipper 141 to allow the "smart" control circuit board 136 to be loaded into the pouch 140. Details of the "smart" control circuit board 136 and other electronic circuitry will be discussed in detail below.

Figures 18, 19, 20, 21, 22, 23, 24:
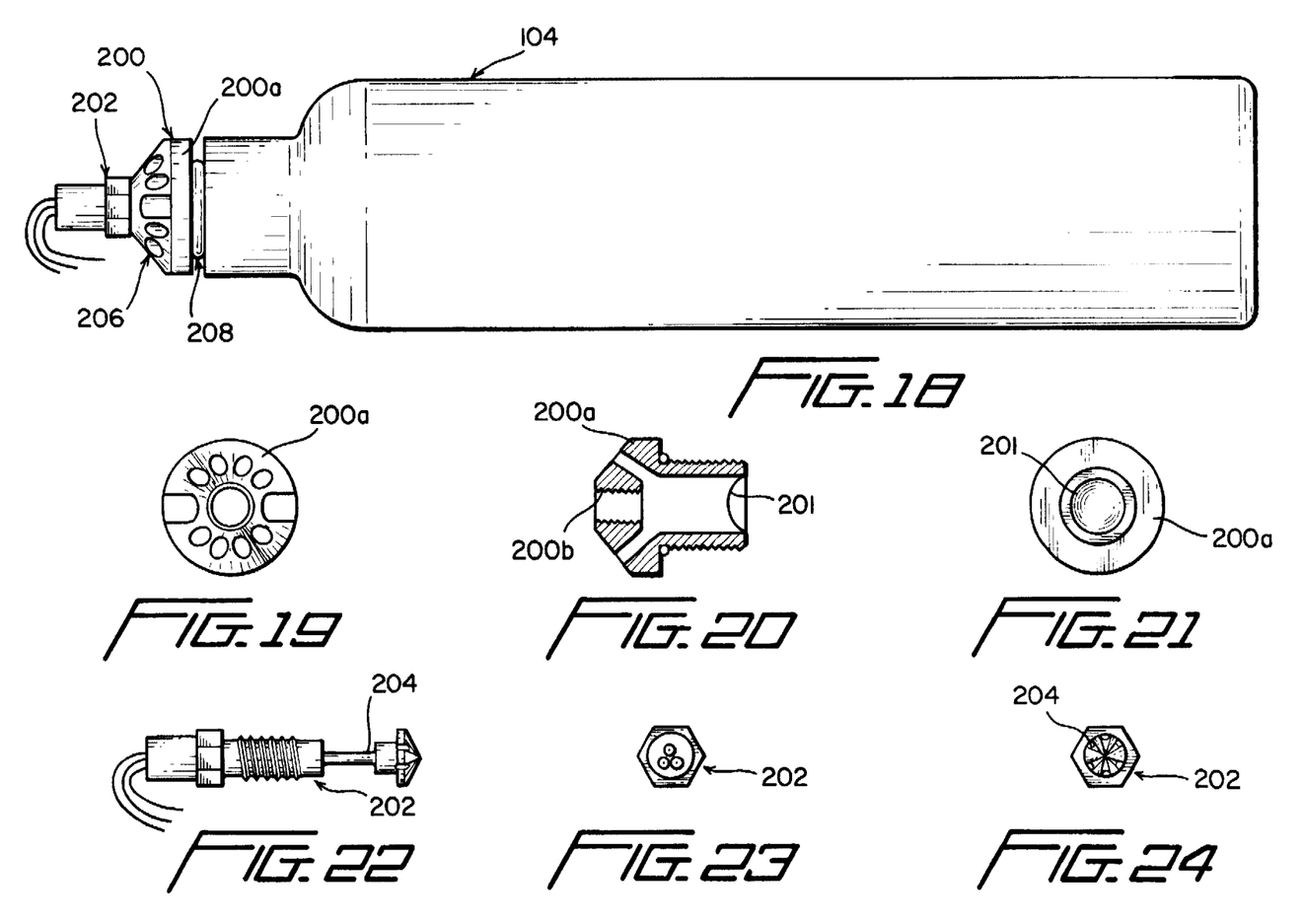
FIG. 18 is a longitudinal elevational view of the pressurized gas cylinder and control valve.
FIG. 19 is an end elevational view of the control valve located on the end of the pressurized gas cylinder shown in FIG. 18.
FIG. 20 is a longitudinal cross-sectional view of the control valve housing of the control valve shown in FIG. 18.
FIG. 21 is an opposite end view of the control valve removed from the gas cylinder showing the burst disc.
FIG. 22 is a side elevational view of the control valve firing mechanism.
FIG. 23 is an end elevational view of the control valve firing mechanism.
FIG. 24 is an opposite end elevational view of the control valve firing mechanism for engaging the burst disc.

The pressurized gas cylinder 104 is provided with the control valve 200, as shown in FIG. 18. The control valve housing 200a is provided with eight nozzle openings 206 used to flow control and channel the released gas into the air bag 102.

Figure 25:
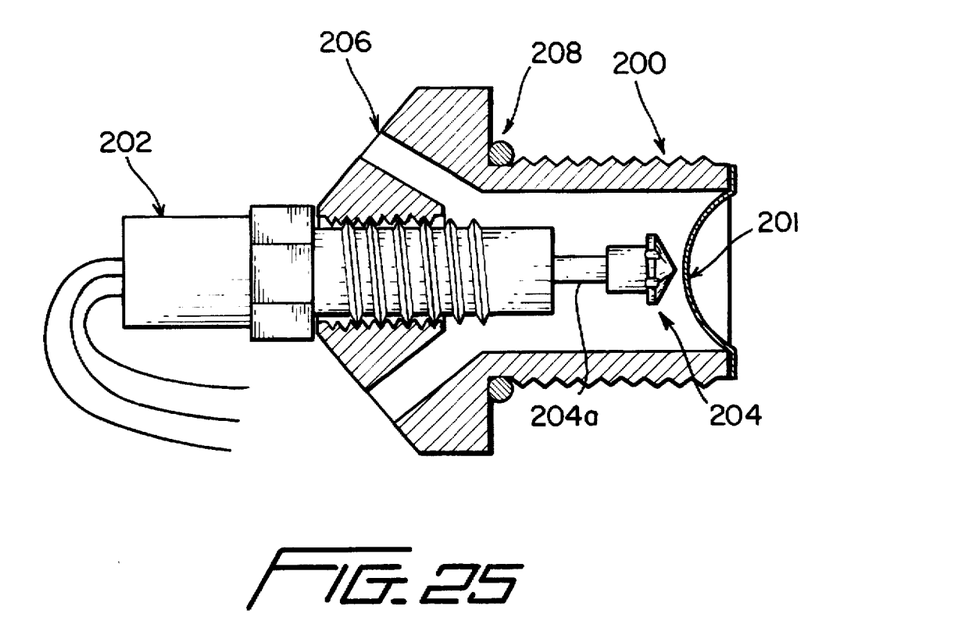
FIG. 25 is a detailed longitudinal cross-sectional view of the control valve firing mechanism in a state prior to firing.

The control valve 200 is provided with a burst disc 201 and a squib 202. The squib 202 screws into a threaded opening 200b in the burst control valve housing 200a, as shown in FIGS. 20 and 25. The squib 202 is provided at one end with a 3-wire interface end. Two of the wire leads are for activation and the third is a ground. The squib 202 is provided at an opposite end with a cutting tip 204, as shown in FIG. 22 and 24.

An enlarged detailed longitudinal cross-sectional view of the control valve 200 with a squib 202 fully retracted prior to activation is shown in FIG. 25. The cutting tip 204 is installed over the drive shaft 204a of the squib 202 to promote rapid opening of the burst disc 201. A gasket seal ring 208 is installed around the outer threaded sleeve 200c of the control valve housing 200a. This provides a pressure barrier to reduce the possibility of leakage between the inner threads of the opening in the bottle 104 and the outer threads of the control valve 200.

Figure 26:
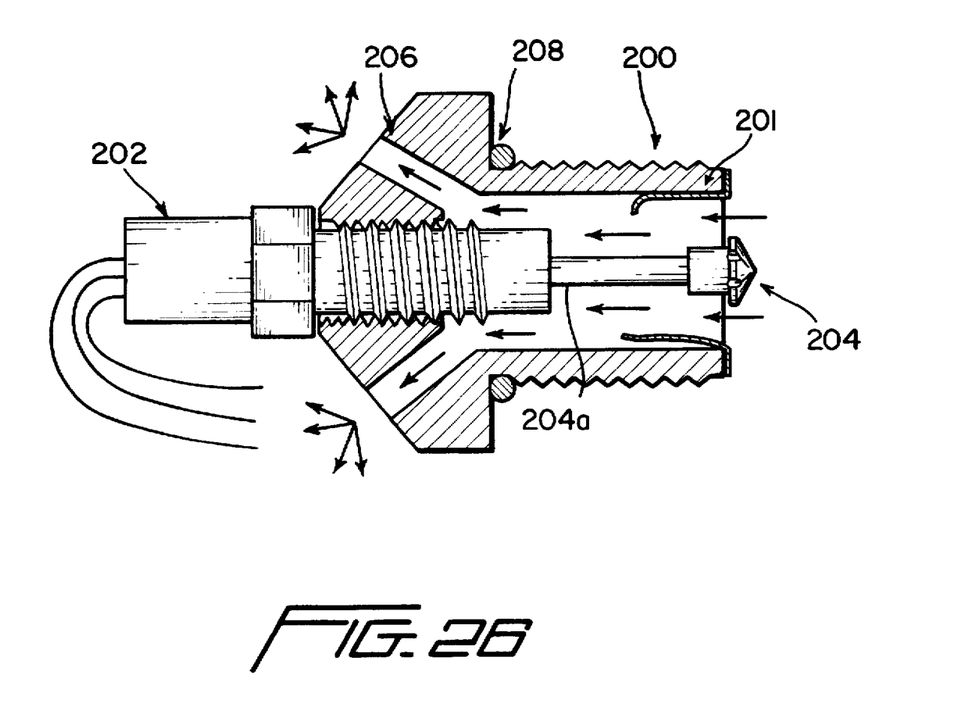
FIG. 26 is a detailed longitudinal cross-sectional view of the control valve firing mechanism in a state after firing.

FIG. 26 shows an activated squib 202. The drive shaft has been forced with the cutting tip 204 to the right driving the cutting tip 204 through the burst disc 201. The burst disc 201, under pressure once penetrated, tears away from the cutting tip 204 creating a large opening and allowing the gas charge in the pressurized gas cylinder 104 to flow past the cutting tip 204 and into the nozzle openings 206. The gas exiting the nozzle openings 206 then rapidly fills the air bag 102.

Figure 27:
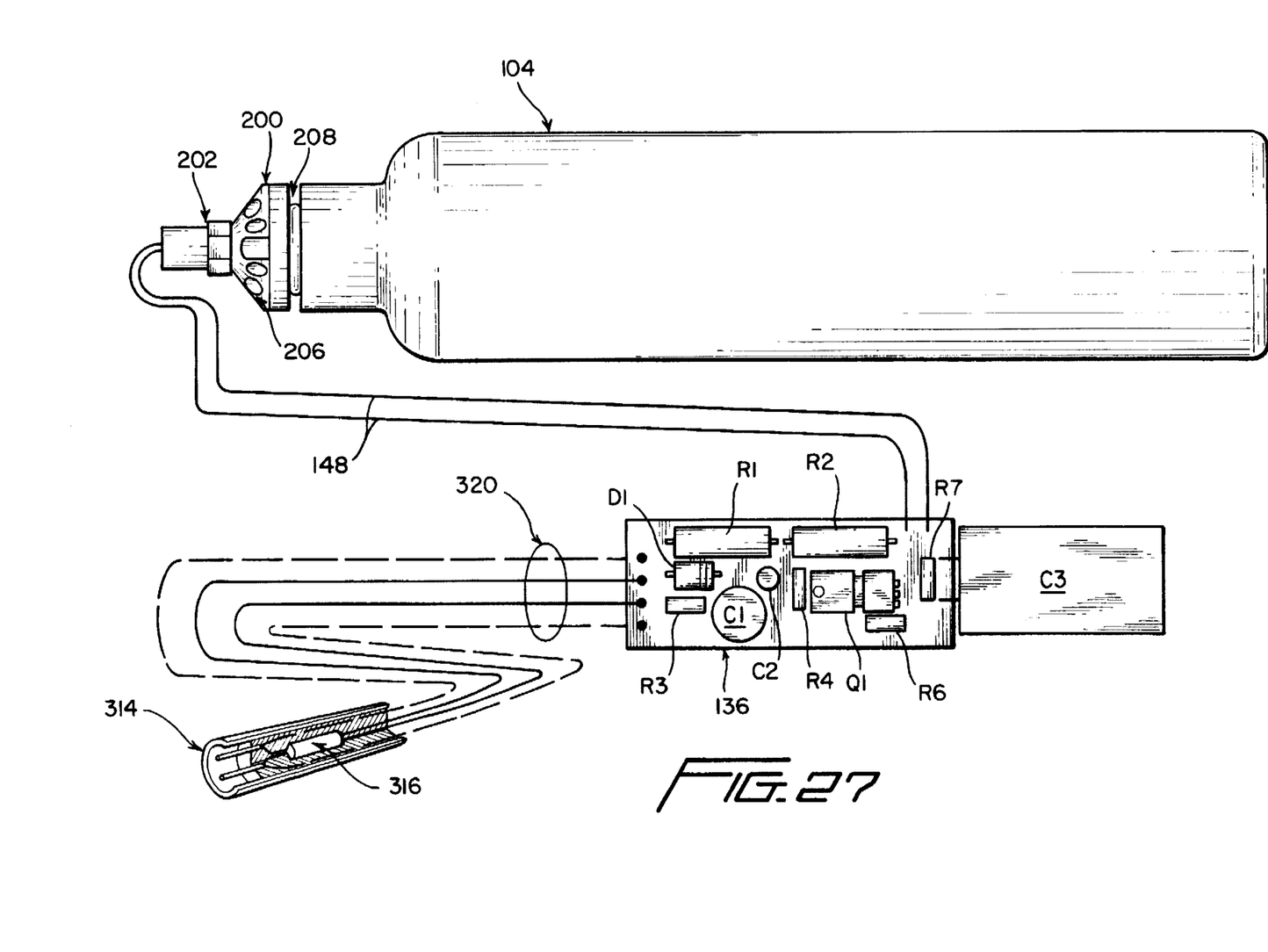
FIG. 27 is a diagrammatic layout showing the electrical connection between the control valve, "smart" control circuit board and plug assembly.

Electrical components of the air bag assembly 100 are shown in FIG. 27. The plug assembly 314 is connected to a wiring harness 320, which carries automotive power from the vehicle and the signal from the crash sensor 316 to the "smart" control circuit board 136. Wiring 148 from the "smart" control circuit board 136 runs to the electrical connections of the squib 202.

Figure 17:
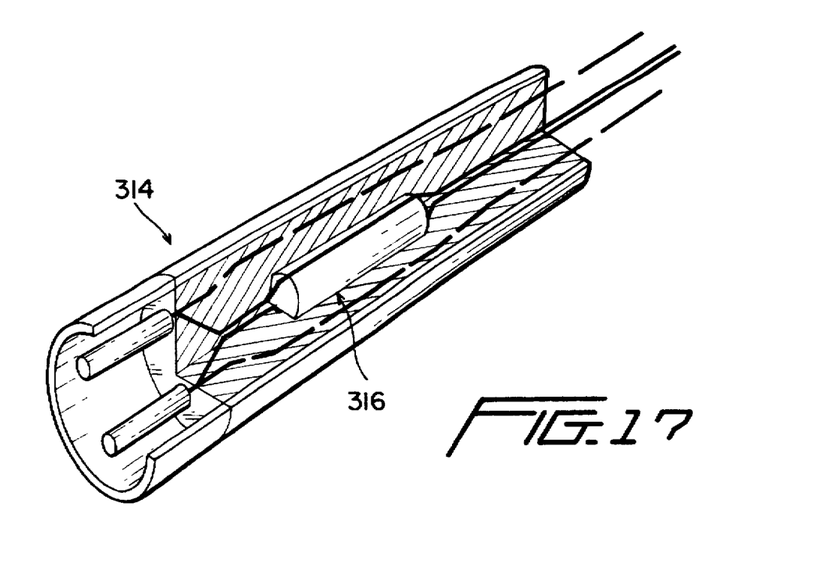
FIG. 17 is a broken away perspective view of the plug-in module.

FIG. 17 shows a plug-in module 314. This plug-in module 314 contains two electrical contacts that mate to matching sleeves in the receptacle 310 to supply power and ground to the "smart" control circuit board 136. Imbedded within the connector body 314 is the Aerodyne Acceleration sensor 316, with two conducting lines which interface the smart circuit board 136 to the sensor 316.

The complete air bag system including the air bag device 100 is electrically connected to the automobile, as shown in FIG. 28. Specifically, a receptacle 310 is mechanically mounted either to the firewall 308, or to a rigid structure supporting the dash to the automotive frame. Automotive power, for example, from the battery, is electrically connected to the receptacle 310. Preferably, the air bag system is provided with a separable connector 322 to allow the portable air bag device 100 to be detachably connected to the remaining portion of the air bag system. This allows for a permanent or semi-permanent installation of the receptacle 310 and plug-in module 314. The provision of separable connector 322 can allow the receptacle 314 and the plug-in module to be combined together (i.e., eliminate plug-in feature).

System

The air bag system comprises the air bag device 100, plug-in module 314 containing crash sensor 316 and receptacle 310. The air bag device has been described in detail above. The sensor device is a plug-in module 318 cooperating with receptacle 310. The receptacle 310 is mounted on the vehicle's firewall or dash in such a manner that an applied deceleration force is applied to the sensor 316 during a vehicle crash. The plug-in module 314 securely mounts in the receptacle 310 when connected.

The receptacle 310 is provided with an electrical connector wired for power to the vehicle battery 312. The plug-in module 314 comprises an electrical connector cooperating with the electrical connector of the receptacle 310 for supplying power to the plug-in module 318. The plug-in module 318 further comprises an impact sensor 316 and a power indicating light 318 to allow visual inspection as to whether the module is electrically connected to the "smart" control circuit board 136 of the air bag device 100.

The "smart" control circuit board 136 is electrically connected to the squib 202 for firing the air bag device 100. Specifically, the gas cylinder 104 is provided with a burst disc assembly 200 which is connected to, and activated by the squib 202.

Electric Control System

Figure 29:
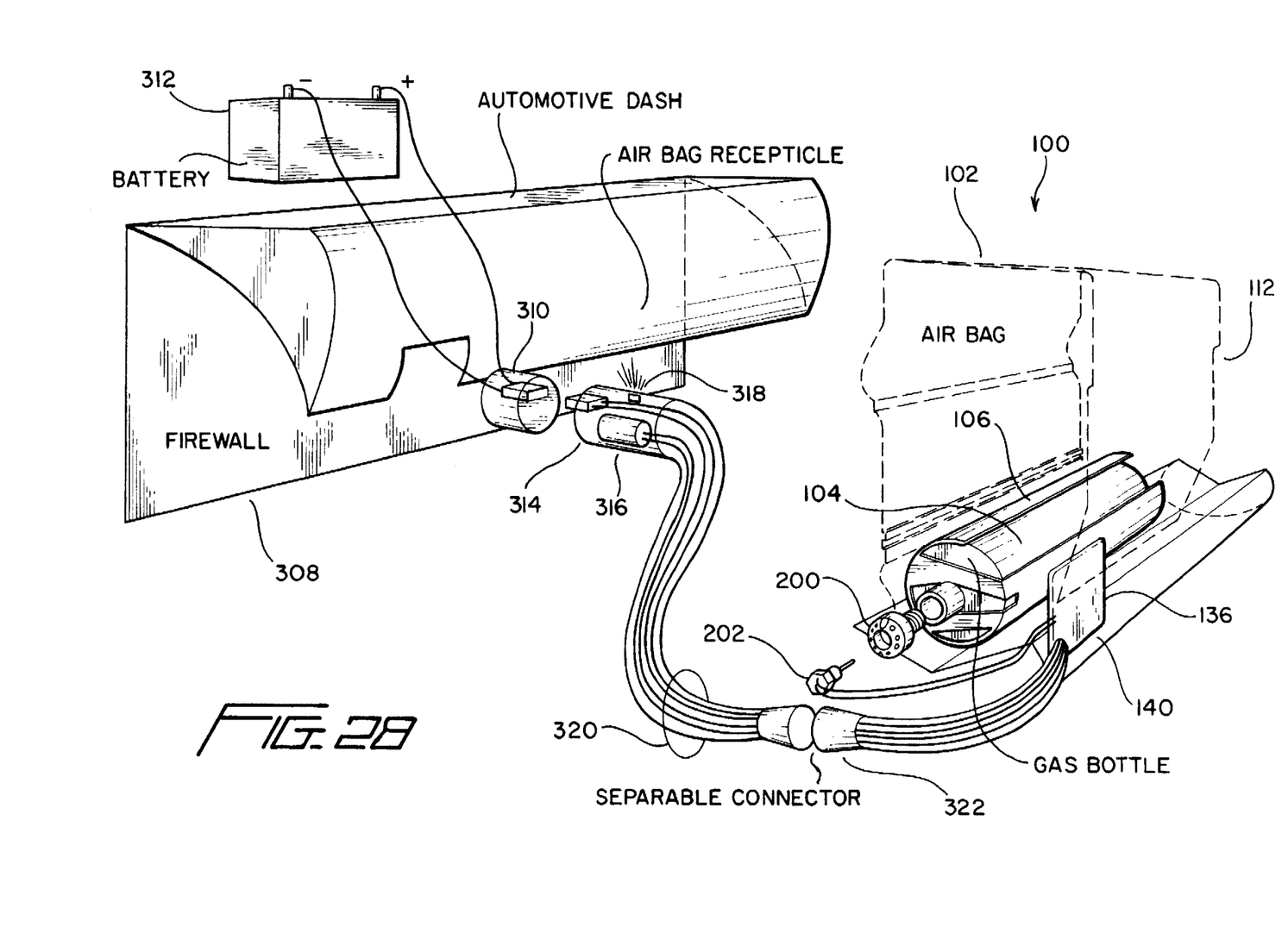
FIG. 29 is a circuit diagram for the firing control (i.e., smart board).

The complete schematic circuit diagram for the electric control system is shown in FIG. 29. Power to the circuitry is provided by the automotive electrical system. The receptacle 310 mounted to the mechanical frame of the vehicle provides two electrical jacks delivering 13.8 V DC to the mating plug-in module 314. The power is then delivered to the "smart" control circuit board 136 installed in the pouch 140 via a conductive wire pair originating from the plug-in module 314, and terminating to two designated solder pads of the printed circuit board defining the "smart" control circuit board 136. Installed within the plug-in module 314 is a sensor 316, for example, an acceleration switch (Aerodyne Controls 8026-1-000), which is electrically connected to the "smart" control circuit board 136 via a separate pair of wires originating from the plug-in module 316 to designated connection points on the printed circuit board defining the "smart" control circuit board 136.

Under a deceleration force of 7.5 g, the Aerodyne acceleration sensor completes an electrical circuit through contact closure. This results in the application of 10 volts to a charging network consisting of R3 and C1. The values of R3 and C1 were selected to meet the following requirements:

1) Commitment to fire for a solid contact closure of 6 milliseconds (mS) or more.
2) No commitment to fire for a solid contact closure of 5 mS or less.

R4 delivers the charging current to the "sensitive Gate SCR" and determines the discharge rate of C1 to meet the third condition:

3) Commitment to fire with a 75% on-state bouncing closure of the Aerodyne sensor for a continuous minimum duration of 8 mS.

The SCR Q1 upon firing completes a current discharge path from C3 through the squib 202 through the SCR in turn activating the squib 202, initiating the air bag deployment.

Drawing Schedule 100 air bag device; air bag assembly
102 air bag
104 pressurized gas cylinder; gas cylinder; bottle assembly; bottle
106 inner sheath; restraint sleeve
108 pocket
112 enclosure
114 rupturable seam
116 flap
118 flap
124 seat belt
126 zipper
128 reinforced eyelets
136 "smart" control circuit board
138 end flap
140 Printed Circuit Board (PCB) enclosure; pouch
141 zipper
142 loop fastener portion
144 hook/loop fastener portion
146 split flap
148 wiring
200 control valve
200a control valve housing
200b threaded opening
200c outer threaded sleeve
201 burst disc
202 squib
204 cutting tip; cutter
204a drive shaft
206 nozzle openings
208 gasket seal ring
308 firewall
310 receptacle
312 battery
314 plug-in module
318 power indicating light
320 wiring harness
322 separable connector

What is claimed is:

1. A portable air bag device, comprising:
   an enclosure;
   an attachment associated with said enclosure for releasably connecting the air bag device to a vehicle restraint belt of a vehicle;
   an air bag connected to said enclosure and stored within said enclosure prior to activation, said air bag including an envelope disposed within said air bag;
   a pressurized gas container contained within said envelop disposed within said air bag;
   a controllable release valve connected to said gas container;
   a sensing device for sensing a deployment condition; and
   a control device operatively connected to said sensing device, said control device controlling the operation of said controllable release valve for deploying said air bag.

2. A portable air bag device according to claim 1, wherein said envelope is provided with a sealable opening for securely enclosing said pressure cylinder inside said envelope.

3. A portable air bag device according to claim 1, wherein said sensor device is a separate remote sensor device mountable on a firewall of the vehicle.

4. A portable air bag device according to claim 3, wherein said control device is a discrete device and mounted inside said enclosure of the portable air bag device.

5. A portable air bag device according to claim 3, including a wiring harness with a releasable connector for connecting said remote sensor device to the portable air bag device.

6. A portable air bag device according to claim 5, wherein said control device is a discrete device and mounted inside said enclosure of the portable air bag device, and said wire harness electrically connects said remote sensor device to said control device.

7. A portable air bag device according to claim 1, wherein said control device is a discrete device and mounted inside said enclosure of the portable air bag device.

8. A portable air bag device according to claim 1, wherein said attachment is defined by a set of overlapping flaps connected to said enclosure that wrap around a vehicle restraint belt, and releasably connect together.

9. A portable air bag device according to claim 8, wherein said flaps are provided with Velcro fasteners for releasably connecting said flaps together.

10. A portable air ba device according to claim 8, wherein said control device and said sensor device are defined by a pressure sensor connected to a power source electrically connected to said controllable release valve defined by an electrical controllable release valve.

11. A portable air bag device according to claim 8, wherein said enclosure is provided with a tearable seam for egress of said air bag from the enclosure during inflation.

* * * * *